United States Patent
Tripathy et al.

(10) Patent No.: US 9,990,352 B2
(45) Date of Patent: Jun. 5, 2018

(54) CHUNK COMPRESSION IN A DEDUPLICATION AWARE CLIENT ENVIRONMENT

(71) Applicant: QUEST SOFTWARE INC., Aliso Viejo, CA (US)

(72) Inventors: Tarun K. Tripathy, Newark, CA (US); Brian R. Smith, San Ramon, CA (US); Abhijit S. Dinkar, San Jose, CA (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 529 days.

(21) Appl. No.: 14/453,165

(22) Filed: Aug. 6, 2014

(65) Prior Publication Data
US 2016/0041970 A1 Feb. 11, 2016

(51) Int. Cl.
*G06F 7/00* (2006.01)
*G06F 17/30* (2006.01)
*G06F 17/27* (2006.01)

(52) U.S. Cl.
CPC .... *G06F 17/2705* (2013.01); *G06F 17/30156* (2013.01)

(58) Field of Classification Search
CPC ......... G06F 17/30153; G06F 2212/401; G06F 9/5011; G06F 17/302; G06F 17/2705
USPC ....................................................... 707/755
See application file for complete search history.

(56) References Cited

U.S. PATENT DOCUMENTS

| | | | |
|---|---|---|---|
| 5,761,722 A | 6/1998 | Vishin | |
| 5,826,082 A | 10/1998 | Bishop | |
| 6,085,247 A | 7/2000 | Parsons | |
| 6,661,801 B1 | 12/2003 | Richards | |
| 8,234,468 B1 | 7/2012 | Deshmukh | |
| 8,396,841 B1 * | 3/2013 | Janakiraman | G06F 3/0608 707/692 |
| 8,458,310 B1 | 6/2013 | Mayor | |
| 8,898,114 B1 | 11/2014 | Feathergill | |
| 9,007,239 B1 * | 4/2015 | Lissack | G06F 9/4418 341/50 |
| 9,098,424 B2 * | 8/2015 | Hyde, II | G06F 12/0891 |
| 9,172,771 B1 | 10/2015 | Gross | |
| 9,268,651 B1 * | 2/2016 | Salyers | G06F 11/1464 |
| 9,357,575 B2 | 5/2016 | Naka et al. | |
| 9,432,192 B1 | 8/2016 | Podge et al. | |
| 2004/0030951 A1 | 2/2004 | Armangau | |
| 2005/0193245 A1 | 9/2005 | Hayden | |
| 2005/0262167 A1 | 11/2005 | Teodosiu et al. | |

(Continued)

OTHER PUBLICATIONS

U.S. Appl. No. 14/453,121, filed Nov. 4, 2016, Non-Final Rejection.
(Continued)

*Primary Examiner* — Binh V Ho
(74) *Attorney, Agent, or Firm* — Maschoff Brennan

(57) ABSTRACT

Techniques and mechanisms described herein facilitate the transmission of a data stream to a networked storage system. According to various embodiments, a data stream may be parsed to identify one or more uncompressed data chunks for transmission to a networked storage system. Each uncompressed data chunk may be compressed to produce a respective compressed data chunk. Each compressed data chunk may be transmitted to the networked storage system via a network for storage at the networked storage system.

12 Claims, 9 Drawing Sheets

(56) References Cited

U.S. PATENT DOCUMENTS

| | | | |
|---|---|---|---|
| 2005/0268068 A1* | 12/2005 | Ignatius | G06F 3/0613 |
| | | | 711/202 |
| 2006/0059173 A1* | 3/2006 | Hirsch | G06F 11/1453 |
| 2006/0150190 A1* | 7/2006 | Gusler | G06F 9/5011 |
| | | | 718/105 |
| 2006/0184652 A1 | 8/2006 | Teodosiu et al. | |
| 2006/0259949 A1 | 11/2006 | Schaefer | |
| 2009/0063665 A1* | 3/2009 | Bagepalli | H04L 63/166 |
| | | | 709/222 |
| 2009/0190760 A1* | 7/2009 | Bojinov | G06F 3/0608 |
| | | | 380/269 |
| 2009/0307251 A1 | 12/2009 | Heller | |
| 2010/0070448 A1 | 3/2010 | Omoigui | |
| 2010/0094847 A1 | 4/2010 | Malan | |
| 2010/0217948 A1 | 8/2010 | Mason et al. | |
| 2010/0228800 A1 | 9/2010 | Aston | |
| 2010/0306354 A1* | 12/2010 | DeHaan | G06F 1/3203 |
| | | | 709/222 |
| 2010/0332401 A1 | 12/2010 | Prahlad | |
| 2011/0179341 A1 | 7/2011 | Falls | |
| 2011/0187817 A1 | 8/2011 | Sasaki | |
| 2011/0307456 A1 | 12/2011 | Jayaraman | |
| 2012/0089579 A1* | 4/2012 | Ranade | G06F 17/30153 |
| | | | 707/693 |
| 2012/0136850 A1* | 5/2012 | Barsness | G06F 17/30501 |
| | | | 707/720 |
| 2012/0191738 A1* | 7/2012 | Koifman | G06F 3/0623 |
| | | | 707/756 |
| 2012/0254417 A1* | 10/2012 | Luna | H04L 67/2828 |
| | | | 709/224 |
| 2012/0265954 A1* | 10/2012 | Haustein | G06F 3/061 |
| | | | 711/160 |
| 2013/0055374 A1* | 2/2013 | Kustarz | H04L 63/1408 |
| | | | 726/13 |
| 2013/0060777 A1 | 3/2013 | Grube | |
| 2013/0067237 A1 | 3/2013 | Huang | |
| 2013/0097380 A1 | 4/2013 | Colgrove | |
| 2013/0138620 A1 | 5/2013 | Yakushev | |
| 2013/0232160 A1 | 9/2013 | Tibble | |
| 2013/0297569 A1 | 11/2013 | Hyde | |
| 2014/0046997 A1 | 2/2014 | Dain | |
| 2014/0075024 A1 | 3/2014 | Koza | |
| 2014/0114932 A1 | 4/2014 | Mallaiah | |
| 2014/0123160 A1 | 5/2014 | Coppenolle | |
| 2014/0189281 A1* | 7/2014 | Sokol, Jr. | G06F 12/08 |
| | | | 711/171 |
| 2014/0214776 A1 | 7/2014 | Bolte | |
| 2014/0280664 A1 | 9/2014 | Sengupta | |
| 2015/0012503 A1 | 1/2015 | Akirav | |
| 2015/0186370 A1 | 7/2015 | Xu et al. | |
| 2016/0041777 A1 | 2/2016 | Tripathy | |
| 2016/0044100 A1 | 2/2016 | Tripathy | |
| 2016/0225732 A1 | 8/2016 | Kim | |

OTHER PUBLICATIONS

U.S. Appl. No. 14/453,121, filed Mar. 24, 2017, Final Rejection.
U.S. Appl. No. 14/453,173, filed Dec. 16, 2016, Non-Final Rejection.
U.S. Appl. No. 14/453,173, filed May 16, 2017, Final Rejection.
U.S. Appl. No. 14/453,173, filed Aug. 25, 2017, Non-Final Rejection.
U.S. Appl. No. 14/453,158, filed Dec. 15, 2015, Non-Final Rejection.
U.S. Appl. No. 14/453,158, filed Sep. 13, 2016, Non-Final Rejection.
U.S. Appl. No. 14/453,158, filed Mar. 16, 2016, Final Rejection.
U.S. Appl. No. 14/453,158, filed Mar. 9, 2017, Final Rejection.
U.S. Appl. No. 14/453,150, filed Jun. 16, 2016, Non-Final Rejection.
U.S. Appl. No. 14/453,150, filed Dec. 30, 2016, Final Rejection.
U.S. Appl. No. 14/453,150, filed Jun. 23, 2017, Non-Final Rejection.

* cited by examiner

CHUNK COMPRESSION IN A DEDUPLICATION AWARE CLIENT ENVIRONMENT

TECHNICAL FIELD

The present disclosure relates generally to data storage, and more specifically to the operation of client devices in communication with network-accessible or network-attached storage systems.

DESCRIPTION OF RELATED ART

Data is often stored in storage systems that are accessed via a network. Network-accessible storage systems allow potentially many different client devices to share the same set of storage resources. A network-accessible storage system can perform various operations that render storage more convenient, efficient, and secure. For instance, a network-accessible storage system can receive and retain potentially many versions of backup data for files stored at a client device. As well, a network-accessible storage system can serve as a shared file repository for making a file or files available to more than one client device.

Some data storage systems may perform operations related to data deduplication. In computing, data deduplication is a specialized data compression technique for eliminating duplicate copies of repeating data. Deduplication techniques may be used to improve storage utilization or network data transfers by effectively reducing the number of bytes that must be sent or stored. In the deduplication process, unique chunks of data, or byte patterns, are identified and stored during a process of analysis. As the analysis continues, other chunks are compared to the stored copy and a redundant chunk may be replaced with a small reference that points to the stored chunk. Given that the same byte pattern may occur dozens, hundreds, or even thousands of times, the amount of data that must be stored or transferred can be greatly reduced. The match frequency may depend at least in part on the chunk size. Different storage systems may employ different chunk sizes or may support variable chunk sizes.

Deduplication differs from standard file compression techniques. While standard file compression techniques typically identify short repeated substrings inside individual files, storage-based data deduplication involves inspecting potentially large volumes of data and identify potentially large sections—such as entire files or large sections of files—that are identical, in order to store only one copy of a duplicate section. In some instances, this copy may be additionally compressed by single-file compression techniques. For example, a typical email system might contain many instances of the same one megabyte (MB) file attachment. In conventional backup systems, each time the system is backed up, all 100 instances of the attachment are saved, requiring 100 MB storage space. With data deduplication, the storage space required may be limited to only one instance of the attachment. Subsequent instances may be referenced back to the saved copy for deduplication ratio of roughly 100 to 1.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide mechanisms for transmitting a data stream to a networked storage system. According to various embodiments, a data stream may be parsed to identify one or more uncompressed data chunks for transmission to a networked storage system. Each uncompressed data chunk may be compressed to produce a respective compressed data chunk. Each compressed data chunk may be transmitted to the networked storage system via a network for storage at the networked storage system.

In some implementations, an amount of available computing resources at the client device and/or networked storage system may be identified. Also, one or more computing resource availability compression thresholds may be identified. Each uncompressed data chunk may be compressed when the amount of available computing resources meets or exceeds the computing resource availability compression threshold.

In particular embodiments, one or more of the uncompressed data chunks may be identified via a rolling hash parsing technique operable to generate at least some identical chunks when parsing different but overlapping data streams.

According to various embodiments, a respective fingerprint may be identified for each uncompressed data chunk by applying a hash function to the uncompressed data chunk. A determination may be made as to whether the uncompressed data chunk is stored at a networked storage system by transmitting each fingerprint to the networked storage system via the network. The determination may involve receiving a fingerprint status message from the networked storage system. The fingerprint status message may indicate whether the chunk associated with the fingerprint is stored at the networked storage system.

In some implementations, a block map update request message including information for updating a block map may be transmitted to the networked storage system. The block map may identify a designated memory location at which each data compressed chunk is stored at the networked storage system.

In particular embodiments, each compressed data chunk may be encrypted prior to transmission. Alternately, or additionally, the networked storage system may be operable to store deduplicated data based on storage requests received via the network. The data stream may be generated at the client device via a network storage protocol such as the Network File System (NFS) protocol, the Common Internet File System (CIFS) protocol, or the Open Storage (OST) protocol.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
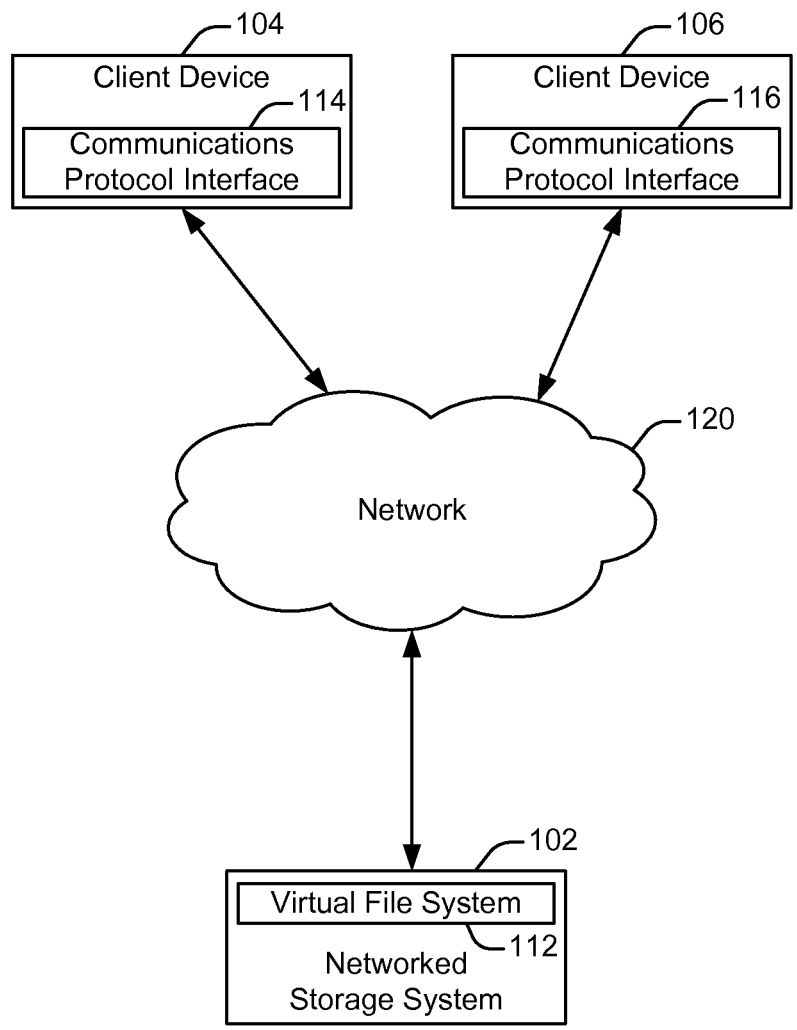
FIG. 1 shows an example of a network storage network storage arrangement, arranged in accordance with one or more embodiments.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular data storage mechanisms. However, it should be noted that the techniques and mechanisms of the present invention apply to a variety of different data storage mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein may facilitate sophisticated interactions between a client device and a networked storage system. For instance, a customized implementation of a communications protocol interface may be used to perform operations such as client-side deduplication. A networked storage system may include a parser configured to parse a data stream into chunks for storage and a fingerprinter configured to determine a fingerprint for each of the chunks. The parser may be configured in such a way that two data streams identical except for offset will be reliably parsed into the same chunks. The storage of duplicate chunks may be avoided by comparing the fingerprints of new chunks with the fingerprints of chunks already stored at the networked storage system. The storage of duplicate chunks may be avoided by comparing the fingerprints of new chunks with the fingerprints of chunks already stored at the networked storage system. The same parser and fingerprinter may also be implemented at a client device in communication with the networked storage system via a network. Then, the client device may parse and fingerprint a data stream before sending data to the networked storage system to avoid sending chunks already stored on the networked storage system. When sufficient computing resources are available at the client device, chunks may be compressed and/or encrypted at the client device prior to transmission to the networked storage system.

Example Embodiments

Client devices frequently employ non-proprietary and commonly available communication protocols such as the Network File System (NFS) and the Common Internet File System (CIFS) to communicate with networked storage systems. For instance, many common backup software suites are configured transmit data over a network through these channels. However, these standard communication protocols transmit data "as-is" and perform little or no optimization at the client device. Various caching strategies are employed to increase data transfer performance. However, data-intrinsic strategies are not employed in these file transfer protocols. For instance, these standard communication protocols do not perform client-side deduplication, compression, encryption, or other such operations. Thus, many common backup configurations frequently send data to a networked storage system that is already stored on the networked storage system.

Client devices may also employ proprietary communications protocols such as Open Storage (OST) to communicate with networked storage systems. For instance, many common backup software suites are configured transmit data over a network through these channels. Some proprietary communications protocols incorporate proprietary technologies in order to boost performance. For instance, a client module implementing a propriety communications protocol may implement client-side deduplication. However, many backup and networked storage solutions are not configured to use these proprietary communications protocols. Moreover, purchasing backup and networked storage solutions that use these proprietary communications protocols may be expensive and may lock the purchaser in to the proprietary protocol.

According to various embodiments, a standard communications protocol interface for a network communications protocols such as NFS or CIFS may be supplemented at a client device with custom communications protocol interface. The custom communications protocol interface may be operable to communicate with other modules at the client device via the standard communications protocol. However, the custom communications protocol interface may include features that facilitate various non-standard interactions with a networked storage system. For instance, the custom communications protocol interface may include a parser and/or fingerprinter to facilitate client-side data deduplication.

In particular embodiments, a client device configured to use a particular communications protocol can enjoy improved performance without changing the protocol from the perspective of other modules at the client device. For example, backup software at the client device may be configured to access an NFS or CIFS mount point for backup and/or restore operations. In this example, by transparently using a custom communications protocol interface that communicates via a standard non-proprietary communications protocol such as NFS or CIFS, the backup software can continue to communicate via the same protocol. However, performance can potentially be improved by non-standard performance improvement techniques implemented in the custom communications protocol interface.

According to various embodiments, data may be deduplicated at the client device. For instance, a data stream designated for storage on the networked storage system may be parsed at the client device using the same parser that exists on the networked storage device. The parser may break the data stream into one or more data chunks, which may be fingerprinted using the same fingerprinter that is used at the networked storage system. The client device may then consult with the networked storage system to determine whether a chunk is already stored at the networked storage system before transmitting the chunk over the network. For instance, the client device may communicate with the networked storage system via custom communications protocol semantics associated with a custom communications protocol.

In particular embodiments, the networked storage system may be operable to compress and/or encrypt chunks stored at the networked storage system. The client device may be operable to facilitate this compression and/or encryption in at least some instances. For example, a client device may compress and/or encrypt a chunk prior to sending it to the networked storage system for storage. As another example, the client device may decompress and/or decrypt a chunk retrieved from the networked storage system.

In some implementations, the client device may be configured with the same encryption, decryption, compression, and/or decompression techniques employed at the networked storage system. In this way, the client device or the networked storage system may interchangeably encrypt, decrypt, compress, or decompress data chunks.

According to various embodiments, the system or device responsible for encrypting, compressing, decrypting, and/or decrypting a chunk may be dynamically determined based on resource availability. For example, the client device may encrypt, decrypt, compress, and/or decompress chunks if the client device has computing resources such as processor time and/or memory available and not being used for other tasks. As another example, the client device may encrypt, decrypt, compress, and/or decompress chunks if the networked storage system is operating under a heavy load and likely to take a considerable length of time to respond to requests.

It should be noted that as used herein, the term encryption is intended to refer to any type of cryptographic encryption algorithm as well as any type of compression algorithm. Similarly, the term "decryption" is intended to refer to any type of cryptographic decryption algorithm as well as any type of decompression algorithm.

In particular embodiments, more than one algorithm may be employed. For instance, a chunk may be first compressed and then encrypted prior to storage. Then, when the chunk is retrieved, the chunk may be first decrypted and then decompressed.

FIG. 1 shows an example of a network storage arrangement, arranged in accordance with one or more embodiments. The network storage arrangement shown in FIG. 1 includes a networked storage system 102 in communication with client devices 104 and 106 via a network 120. The client devices are configured to communication with the networked storage system 102 via the communications protocol interfaces 114 and 116. The networked storage system 102 is configured to process file-related requests from the client devices via the virtual file system 102.

According to various embodiments, the client devices and networked storage system shown in FIG. 1 may communicate via a network 120. The network 120 may include any nodes or links for facilitating communication between the end points. For instance, the network 120 may include one or more WANs, LANs, MANs, WLANs, or any other type of communication linkage.

In some implementations, the networked storage system 102 may be any network-accessible device or combination of devices configured to store information received via a communications link. For instance, the networked storage system 102 may include one or more DR6000 storage appliances provided by Dell Computer of Round Rock, Tex.

In some embodiments, the networked storage system 102 may be operable to provide one or more storage-related services in addition to simple file storage. For instance, the networked storage system 102 may be configured to provide deduplication services for data stored on the storage system. Alternately, or additionally, the networked storage system 102 may be configured to provide backup-specific storage services for storing backup data received via a communication link.

According to various embodiments, each of the client devices 104 and 106 may be any computing device configured to communicate with the networked storage system 102 via a network or other communications link. For instance, a client device may be a desktop computer, a laptop computer, another networked storage system, a mobile computing device, or any other type of computing device. Although FIG. 1 shows two client devices, other network storage arrangements may include any number of client devices. For instance, corporate networks often include many client devices in communication with the same networked storage system.

According to various embodiments, the client devices may communicate with the networked storage system 102 via the communications protocol interfaces 114 and 116. Different client devices may employ the same communications protocol interface or may employ different communications protocol interfaces. The communications protocol interfaces 114 and 116 shown in FIG. 1 may function as channel protocols that include a file-level system of rules for data exchange between computers. For example, a communications protocol may support file-related operations such as creating a file, opening a file, reading from a file, writing to a file, committing changes made to a file, listing a directory, creating a directory, etc. Types of communication protocol interfaces that may be supported may include, but are not limited to: Network File System (NFS), Common Internet File System (CIFS), Server Message Block (SMB), Open Storage (OST), Web Distributed Authoring and Versioning (WebDAV), File Transfer Protocol (FTP), Trivial File Transfer Protocol (TFTP).

In some implementations, a client device may communicate with a networked storage system using the NFS protocol. NFS is a distributed file system protocol that allows a client computer to access files over a network in a fashion similar to accessing files stored locally on the client computer. NFS is an open standard, allowing anyone to implement the protocol. NFS is considered to be a stateless protocol. A stateless protocol may be better able to withstand a server failure in a remote storage location such as the networked storage system 102. NFS also supports a two-phased commit approach to data storage. In a two-phased commit approach, data is written non-persistently to a storage location and then committed after a relatively large amount of data is buffered, which may provide improved efficiency relative to some other data storage techniques.

In some implementations, a client device may communicate with a networked storage system using the CIFS protocol. CIFS operates as an application-layer network protocol. CIFS is provided by Microsoft of Redmond Wash. and is a stateful protocol.

In some embodiments, a client device may communicate with a networked storage system using the OST protocol provided by NetBackup.

In some embodiments, different client devices on the same network may communicate via different communication protocol interfaces. For instance, one client device may run a Linux-based operating system and communicate with a networked storage system via NFS. On the same network, a different client device may run a Windows-based operating system and communicate with the same networked storage system via CIFS. Then, still another client device on the network may employ a NetBackup backup storage solution and use the OST protocol to communicate with the networked storage system 102.

According to various embodiments, the virtual file system layer (VFS) 102 is configured to provide an interface for client devices using potentially different communications protocol interfaces to interact with protocol-mandated operations of the networked storage system 102. For instance, the virtual file system 102 may be configured to send and receive communications via NFS, CIFS, OST or any other appropriate protocol associated with a client device.

In some implementations, the network storage arrangement shown in FIG. 1 may be operable to support a variety of storage-related operations. For example, the client device 104 may use the communications protocol interface 114 to create a file on the networked storage system 112, to store data to the file, to commit the changes to memory, and to close the file. As another example, the client device 106 may use the communications protocol interface 116 to open a file on the networked storage system 102, to read data from the file, and to close the file.

In particular embodiments, a communications protocol interface 114 may be configured to perform various techniques and operations described herein. For instance, a customized implementation of an NFS, CIFS, or OST communications protocol interface may allow more sophisticated interactions between a client device and a networked storage system.

According to various embodiments, a customized communications protocol interface may appear to be a standard communications protocol interface from the perspective of the client device. For instance, a customized communications protocol interface for NFS, CIFS, or OST may be configured to receive instructions and provide information to other modules at the client device via standard NFS, CIFS, or OST formats. However, the customized communications protocol interface may be operable to perform non-standard operations such as a client-side data deduplication.

Figure 2:
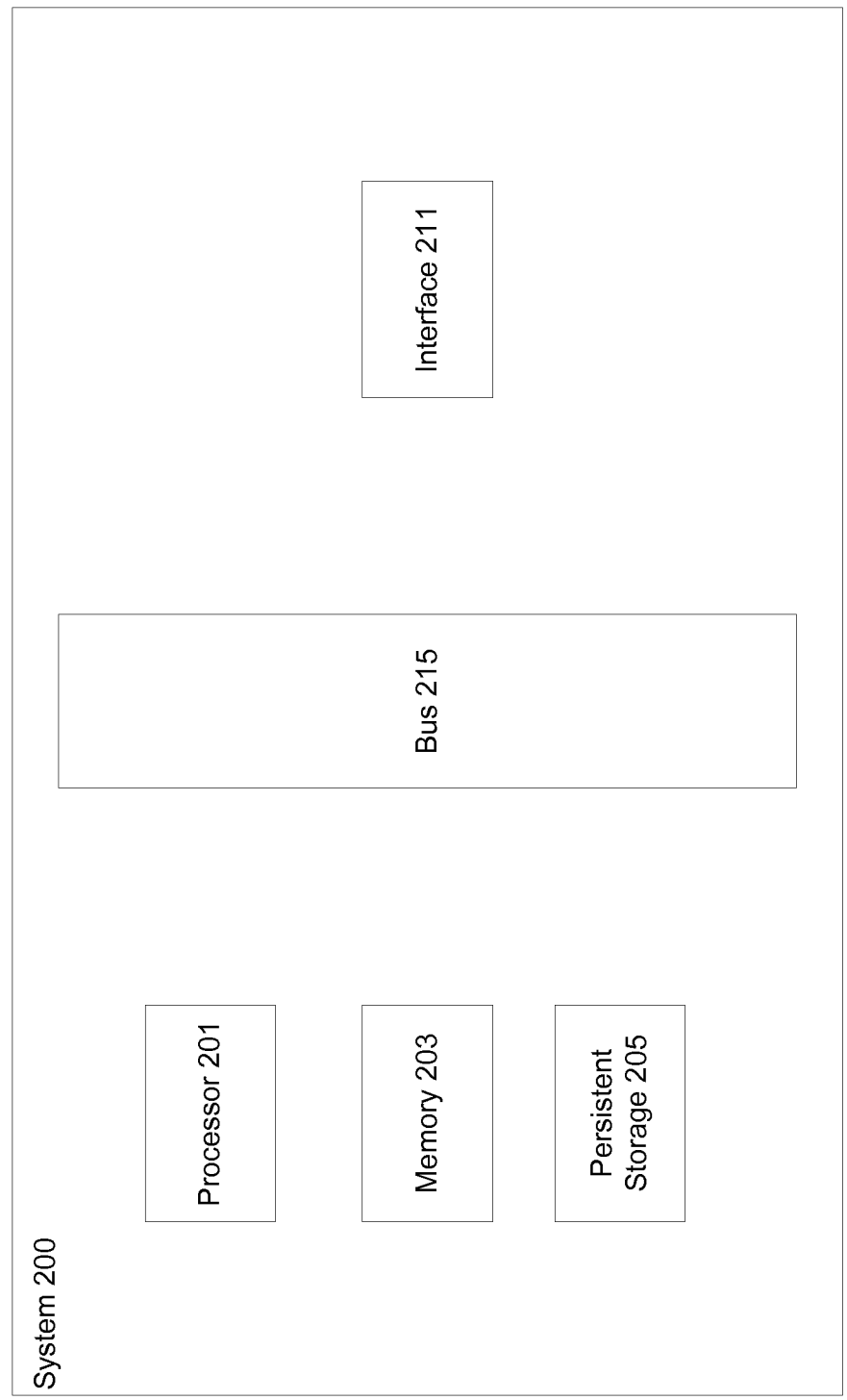
FIG. 2 illustrates a particular example of a system that can be used in conjunction with the techniques and mechanisms of the present invention.

FIG. 2 illustrates a particular example of a system that can be used in conjunction with the techniques and mechanisms of the present invention. According to particular example embodiments, a system 200 suitable for implementing particular embodiments of the present invention includes a processor 201, a memory 203, an interface 211, persistent storage 205, and a bus 215 (e.g., a PCI bus). For example, the system 200 may act as a client device such as the client device 104 or the client device 106 shown in FIG. 1. When acting under the control of appropriate software or firmware, the processor 201 is responsible for such tasks such as generating instructions to store or retrieve data on a remote storage system. Various specially configured devices can also be used in place of a processor 201 or in addition to processor 201. The complete implementation can also be done in custom hardware. The interface 211 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 205 may include disks, disk arrays, tape devices, solid state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 200 uses memory 203 to store data and program instructions and maintain a local side cache. The program instructions may control the operation of an operating system and/or one or more applications, for example. The memory or memories may also be configured to store received metadata and batch requested metadata.

Figure 3:
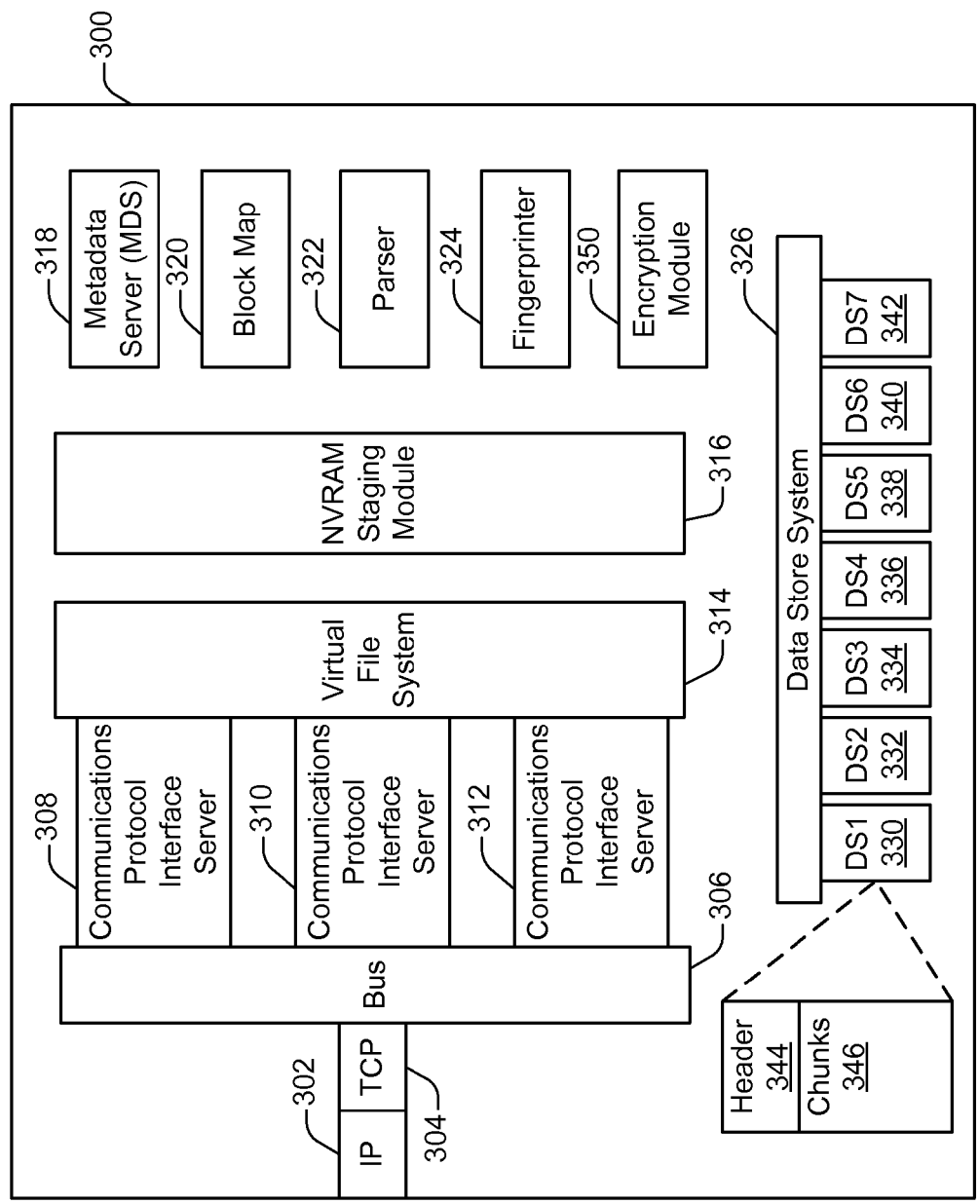
FIG. 3 illustrates a particular example of a networked storage system, configured in accordance with one or more embodiments

FIG. 3 illustrates an example of a networked storage system 300, configured in accordance with one or more embodiments. The networked storage system 300 may be operable to communicate with one or more client devices via a network. The communications may be conducted via one or more communications protocols such as NFS, CIFS, or OST.

The networked storage system 300 includes TCP/IP interfaces 302 and 304 in communication with communications protocol interface servers 308, 310, and 312 via a bus 306. The communications protocol interface servers are configured to facilitate various storage operations by communicating with the virtual file system 314. The networked storage system 300 includes an NVRAM module 318 configured to temporarily store data such as file data designated for storage in the storage system 300. The networked storage system 300 also includes a metadata server (MDS) 318, a block map 320, a parser 322, a fingerprinter 324, an encryption module 350, and a data store system 326. The data store system is configured to manage the data stores 330-342.

At 302, an Internet Protocol (IP) communications interface is shown. According to various embodiments, the IP communications interface 302 is configured to send and receive packets based on IP addresses in packet headers. For instance, the IP communications interface 302 may send packets to client devices and receive packets from client devices via a network.

In some implementations, the IP communications interface 302 may communicate with the TCP communications interface 304. In some implementations, the TCP communications interface 304 may provide for reliable, ordered, and error-checked delivery of a data stream between programs running on computers connected to a network. For instance, the TCP communications interface 304 may be responsible for ensuring that packets reach their destinations and, when necessary, resending packets.

According to various embodiments, a data stream between the storage system 300 and a client device may be routed through a communications protocol interface server based on the communications protocol used by the client device. For instance, each communications protocol interface server may be operable to send and receive communications via a protocol such as NFS or CIFS. The storage system 300 includes the communications protocol interface servers 308, 310, and 312. However, implementations of a storage system may include one, two, three, or any number of communications protocol interface servers. Communications between the TCP/IP interfaces 302 and 304 and the communications protocol interface servers 308, 310, and 312 may be transmitted via the bus 306.

In some implementations, each of the communications protocol interface servers may be configured to communicate with the virtual file system 314. The virtual file system 314 provides an interface between the different communications protocol interface servers and the more concrete file system of the storage system 300. For instance, the VFS supports operations which may include but are not limited to: creating a file, opening a file, reading a directory, making a directory, unlinking or removing a file, removing a directory, closing a file, syncing or committing a change to a file, writing to a file, and reading from a file. Instructions to perform such operations may be received via a standard interface implemented by different communications protocol interface servers. In this way, an instruction to perform a file operation such as creating a file may be transmitted via any of several protocols and implemented in a standard way by the virtual file system 314.

In some embodiments, the NVRAM staging module 316 may temporarily store data for any of various purposes. For instance, the NVRAM staging module may store data received in write requests from a client device. Then, the data may be written to the data store system 326 when the write requests are committed or synchronized.

According to various embodiments, the parser 322 may be configured to receive a stream of data and separate the data into chunks for storage in the data store system 326. The parser 322 may be configured in such a way that two data streams identical except for offset will be reliably parsed into the same chunks. Also, two similar and well-ordered data streams may be reliably parsed in a similar fashion. In this way, data streams may be parsed into chunks in a manner likely to frequently generate duplicate chunks when similar data is provided to the parser. Then, the system can employ deduplication techniques to avoid storing duplicate copies of the same data.

Various techniques exist for parsing a data stream into chunks. In particular embodiments, the parser may employ a rolling hash technique such as Rabin-Karp. The parser may parse a data stream in increments such as 8 bytes. The hash may be computed in a rolling fashion. When the rolling hash is generated, a computed hash value may be compared with one or more criteria to determine whether the computed hash value qualifies as a chunk boundary. For instance, one criterion may indicate that a chunk boundary has been reached when the computed hash value is a prime number. The parser may also enforce a minimum and/or maximum chunk size. For example, chunks may be limited in size to between 16 and 48 kilobytes. Alternately, different chunk size restrictions may be used for different types of data presented. In this way, similar data streams may be parsed into similar chunks.

In particular embodiments, different chunks associated with the same file may be stored at different locations in the data store system 326. Alternately, or additionally, a single chunk may potentially include data from more than one file. The metadata server (MDS) 318 may maintain information about which files are stored on the storage system 318. The block map 320 may maintain information about where the chunks associated with each file are stored in the data store system 326.

In some embodiments, the metadata server 318 is operable to maintain one or more namespaces for data stored on the storage system 300. For instance, when a file is created, an MDS entry may be created in the metadata server 318. The MDS entry may include the file's name and point to a block map, which functions similarly to a UNIX system inode. For instance, an MDS entry representing a client file in the MDS 318 may point to a block map containing several entries in the block map 320.

In some embodiments, the storage system 300 may include a fingerprinter such as the fingerprinter 324. The fingerprinter 324 may generates a fingerprint of a chunk for purposes such as identification and deduplication. A fingerprint may also be referred to as a hash value or a checksum. For instance, the fingerprinter 324 may compute a hash value using a hash function such as MD5, SHA-1, SHA-256, another Secure Hash Algorithm (SHA) hash function, or any other suitable hash function.

According to various embodiments, the block map 320, which functions similarly to a UNIX system inode, is operable to maintain entries indicating the storage locations for data associated with files stored in the storage system 320. Each block map entry may designate a portion of a file that is stored in the chunk. For instance, a block map entry may designate a file offset that indicates which portion of the file is stored in the chunk. Each block map entry may also designate a data store ID that identifies a particular data store in the data store system 326 where the aforementioned chunk can be found. Each data store may include one or more chunks.

According to various embodiments, the data store system 326 may be configured to store information parsed by the parser 322. The configuration of the data store system 326 may be strategically determined based on the underlying storage technology. For instance, the data store system 326 may be configured to store data on one or more storage disks configured in accordance with the Redundant Array of Independent Disks (RAID) storage standard.

In particular embodiments, the data store system 326 may include a plurality of data stores, such as the data stores 330-342. In the storage system 300, only seven data stores are shown. However, the number of data stores may depend on factors such as the amount of data stored in the storage system. For instance, data store systems commonly include millions of data stores in a single system.

In some embodiments, each data store may be configured to store one or more chunks. For example, a data store may be configured to store up to a designated number of chunks, such as 1024. As another example, a data store may be configured to store up to a designated amount of data, such as 20 GB. The configuration of the data store parameters may be strategically determined based on the underlying storage technology.

According to various embodiments, each data store may be associated with a unique identifier. The data store may include a header portion and a chunk portion. For instance, the data store 330 includes the header portion 344 and the chunk portion 346. The chunk portion 346 stores the data included in the chunks. The header portion stores metadata associated with the chunks. For instance, the header portion may include one header entry for each chunk stored in the data store. Each entry may include the chunk fingerprint generated by the fingerprinter 324, the offset within the data store that indicates where in the data store the chunk is stored. In particular embodiments, the header portion may be indexed to facilitate rapid search.

In some implementations, the networked storage system may include an encryption module such as the encryption module 350. The encryption module may be operable to perform operations such as encryption, decryption, compression, and/or decompression. For example, the encryption module may be configured to encrypted unencrypted chunks for storage in the data store system 326 and/or decrypt encrypted chunks before providing them to a client device. As another example, the encryption module may be configured to compress chunks for storage in the data system 326 and/or decompress chunks before providing them to a client device.

Figure 4:
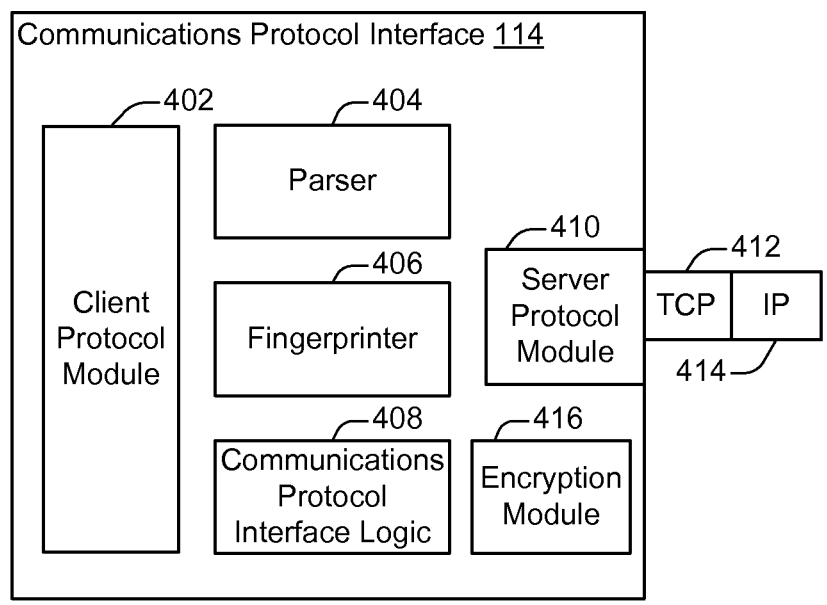
FIG. 4 illustrates an example of a communications protocol interface, configured in accordance with one or more embodiments.

FIG. 4 illustrates an example of a communications protocol interface 114, configured in accordance with one or more embodiments. The communications protocol interface 114 may be located at a client device and configured to facilitate potentially complex interactions between the client device and a remote server such as a networked storage system.

According to various embodiments, the communications protocol interface 114 includes a client protocol module 402, a parser 404, a fingerprinter 406, communications protocol interface logic 408, a server protocol module 410, and an encryption module 416. The communications protocol interface 114 may be communicably coupled with TCP/IP interfaces 412 and 414 which may facilitate communications with a remote server. The TCP/IP interfaces 412 and 414 may be substantially similar to the TCP/IP modules 302 and 304 discussed with respect to FIG. 3.

In particular embodiments, the communications protocol interface 114 may be configured to appear to other modules at the client device as a conventional communications protocol interface while at the same time performing unconventional tasks such as client-side deduplication. The communications protocol interface 114 may perform such tasks at least in part by incorporating one or more components similar to those more conventionally found in a remote server.

According to various embodiments, the communications protocol interface 114 may implement a parser and fingerprinter substantially similar to those present at a networked storage system. Applying the same parsing and fingerprinting techniques at communications protocol interface 114 located at the client device may allow for operations such as client-side deduplication. For instance, rather than blindly sending data from the client device to a networked storage system when that data maybe a duplicate of data already stored at the networked storage system, the communications protocol interface may first parse and fingerprint the data. Then, the client device may communicate with the networked storage system to determine whether the data needs to be sent. If the data does not need to be sent, then bandwidth may be reduced. If the data does need to be sent, then the data may be stored directly in storage at the networked storage system without necessarily performing server-side deduplication of the data. In this way, bandwidth usage and/or server-side resources may be conserved.

According to various embodiments, the client protocol module may be configured to allow the communications protocol interface 114 to communicate with other modules at the client device via a standard communications protocol. For instance, a processor at the client device may communicate with the communications protocol interface 114 via a protocol such as CIFS, OST, or NFS. The client protocol module 402 may be configured to process communications sent and received in such formats.

According to various embodiments, the parser 404 may be configured to receive a stream of data and separate the data into chunks for storage at a networked storage system. The parser 404 may be configured in such a way that two data streams identical except for offset will be reliably parsed into the same chunks. Also, two similar and well-ordered data streams may be reliably parsed in a similar fashion. In this way, data streams may be parsed into chunks in a manner likely to frequently generate duplicate chunks when similar data is provided to the parser. Then, the system can employ deduplication techniques to avoid storing duplicate copies of the same data.

In particular embodiments, the parser 404 is identical to the parser 322 implemented at the networked storage system in communication with the client device. By implementing the same parser at the client device, data can be parsed in the same way at the two devices. For instance, if the same data stream were to be parsed at the client-side and server-side parsers, the chunks that resulted from the different parsing operations may be identical.

In some embodiments, the fingerprinter 406 may generate a fingerprint of a chunk for purposes such as identification and deduplication. A fingerprint may also be referred to as a hash value or a checksum. For instance, the fingerprinter 406 may compute a hash value using a hash function such as MD5 SHA-1, SHA-256, another Secure Hash Algorithm (SHA) hash function, or any other suitable hash function.

In particular embodiments, the fingerprinter 406 is identical to the fingerprinter 324 implemented at a networked storage system in communication with the client device. By implementing an identical fingerprinter at the client device, data can be fingerprinted in the same way at the two devices. For instance, if the same chunks were to be fingerprinted at the client-side and server-side fingerprinter, the fingerprints that resulted from the different fingerprinting operations may be identical In some embodiments, the communications protocol interface logic 408 may be configured with instructions to facilitate various interactions between the client and a server such as a networked storage system. For instance, the communications protocol interface logic 408 may be configured with computer programming language instructions that govern the operation of the other components of the communications protocol interface 114. In one example, the communications protocol interface logic 408 may be configured to facilitate client-side data deduplication, as is discussed with respect to FIG. 5.

According to various embodiments, the server protocol module 410 may be operable to communicate with a remote server such as a networked storage system. For instance, the server protocol module 410 may be configured to communicate using a proprietary protocol. The server protocol module 410 may be operable to perform operations such as determining whether a chunk having a particular fingerprint is stored at the networked storage system. Alternately, or additionally, the server protocol module 410 may be operable to store information to and/or retrieve information from the networked storage system. For example, the server protocol module 410 may be equipped for direct memory access at the networked storage system.

In some implementations, the networked storage system may include an encryption module such as the encryption module 416. The encryption module may be operable to perform operations such as encryption, decryption, compression, and/or decompression. For example, the encryption module may be configured to encrypted unencrypted chunks for transmission to the networked storage system and/or decrypt encrypted chunks received from the networked storage system. As another example, the encryption module may be configured to compress chunks for transmission to the networked storage system and/or decompress chunks received from the networked storage system.

In particular embodiments, the encryption module 416 may be substantially similar to the encryption module 350 shown in FIG. 3. For instance, both encryption modules may be configured to perform the same types of encryption, decryption, compression, and/or decompression. In this way, a chunk may be interchangeably compressed, decompressed, encrypted, or decrypted at the networked storage system and/or the client device.

Figure 5:
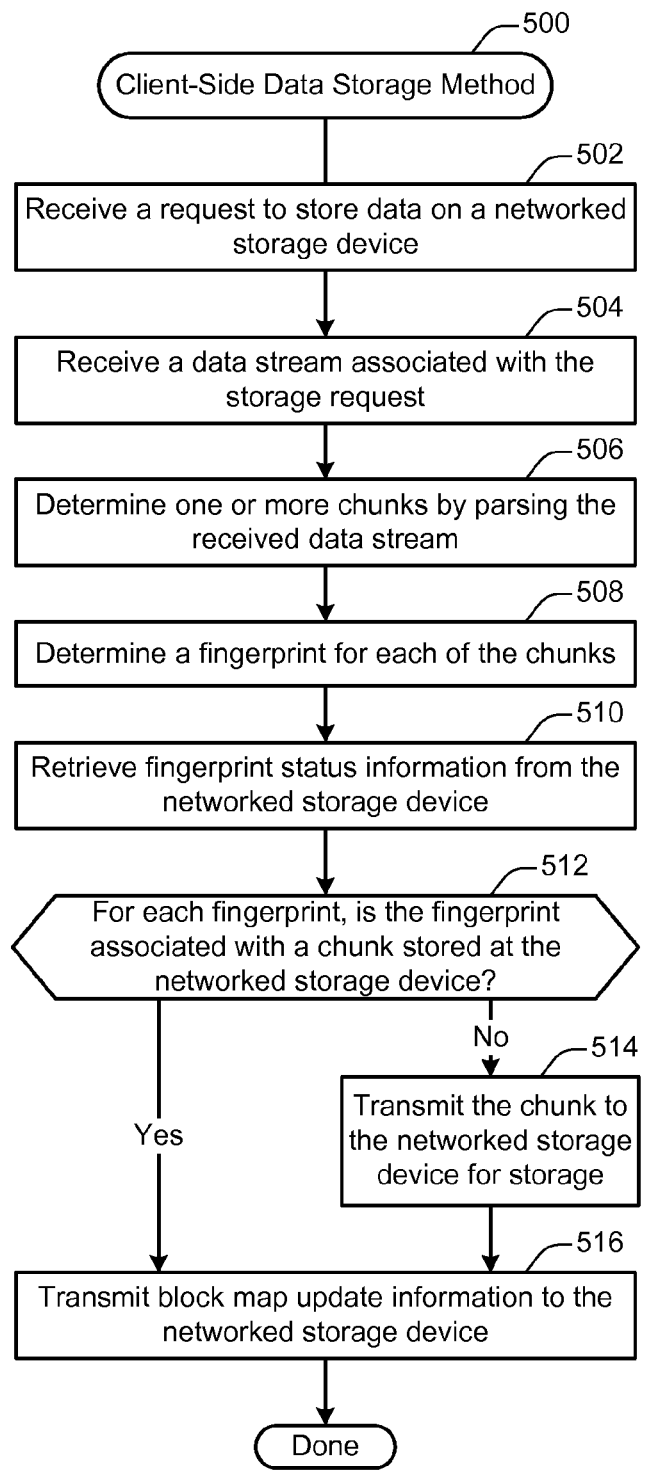
FIG. 5 illustrates an example of a client-side data storage method, performed in accordance with one or more embodiments.

FIG. 5 illustrates an example of a client-side data storage method 500, performed in accordance with one or more embodiments. The method 500 may be performed as part of a procedure in which data is transmitted from a client device to a networked storage system for storage. The method 500 may be performed on a client device, such as the client device 104 shown in FIG. 1.

In particular embodiments, the method 500 may be performed in association with a communications protocol interface configured to facilitate interactions between the client machine and the networked storage system. For instance, the method 500 may be performed in association with the communications protocol interface 114 shown in FIG. 4.

At 502, a request to store data on a networked storage system is received. In some embodiments, the request may be received as part of a backup operation. For instance, the client device may initiate the request in order to store backup data on the networked storage system. Alternately, or additionally, the request may be received as part of an operation to store data for retrieval by other devices via a network.

According to various embodiments, the request may be generated by a processor or other module on the client device. The request may be received at a client protocol module such as the module 402 shown in FIG. 4. For instance, the request may conform to a communications protocol for transmitting information via a network, such as a CIFS, OST, or NFS protocol.

In some implementations, the request may identify various metadata associated with a storage operation. For instance, the request may include one or more headers that identify one or more file names, file sizes, directories, or other such data.

At 504, a data stream associated with the storage request is received. According to various embodiments, the data stream may include data designated for storage. For instance, the data stream may include the contents of one or more files identified in the request received at operation 502.

In some embodiments, the data stream may be provided in accordance with a communications protocol for transmitting information via a network such as CIFS, OST, or NFS. The data stream may be received at a client protocol module such as the module 402 shown in FIG. 4.

At 506, one or more chunks are determined by parsing the received data stream. According to various embodiments, the chunks may be determined by parsing the data stream with the parser 404 shown in FIG. 4. As discussed with respect to FIGS. 3 and 4, the parser may be configured in such a way that two data streams identical except for offset will be reliably parsed into the same chunks. Also, two similar and well-ordered data streams may be reliably parsed in a similar fashion. In this way, data streams may be parsed into chunks in a manner likely to frequently generate duplicate chunks when similar data is provided to the parser.

At 508, a fingerprint is determined for each of the chunks. According to various embodiments, the fingerprint may be determined by the fingerprinter 406. As discussed with respect to FIGS. 3 and 4, the fingerprint may be a hash value generated using a hash function such as MD5 or SHA-1.

At 510, fingerprint status information from the networked storage system is retrieved. In some embodiments, the fingerprint status information may be retrieved by transmitting the fingerprints determined at operation 508 to the networked storage system. The fingerprints may be substantially smaller than the chunks with which they are associated. Thus, transmitting the fingerprints to the networked storage system may require substantially less bandwidth than transmitting the entire chunks.

In particular embodiments, the fingerprints may be transmitted via the server protocol module 410. The fingerprints may be transmitted as part of a request to the networked storage system to determine whether chunks associated with the fingerprints are stored at the networked storage system. When the request is received, the networked storage system may provide a response that indicates which of the chunks are stored on the networked storage system and/or which of the chunks are not stored on the networked storage system. Techniques for providing fingerprint status information at the networked storage system are discussed in additional detail with respect to the method 600 shown in FIG. 6.

At 512, a determination is made for each fingerprint as to whether the fingerprint is associated with a chunk stored at the networked storage system. According to various embodiments, the determination may be made by processing one or more messages received from the networked storage system as part of the operation 510.

At 514, the chunk is transmitted to the networked storage system if it is determined that chunk fingerprint is associated with a chunk stored at the network storage device. According to various embodiments, the chunk may be transmitted via the server protocol module 410 shown in FIG. 4. The chunk may be stored at the networked storage system in a data store managed by the data store system 326 shown in FIG. 3.

In particular embodiments, transmitting the chunk to the networked storage device may involve encrypting and/or compressing the chunk prior to storage. For instance, a determination may be made as to whether sufficient computing resources exist at the client device to encrypted and/or compress the chunk. Techniques for encrypting and/or or compressing a chunk are discussed in further detail with respect to FIG. 8.

At 516, block map update information is transmitted to the networked storage system. According to various embodiments, the block map update information may be used for updating a block map such as the block map 320 and/or the MDS 318 shown in FIG. 3. The contents of the block map update information may vary based at least in part on the determination made at operation 512.

For example, if it is determined that the chunk is already stored on the networked storage system, then the block map update information may include new block map and/or MDS entries that point to the existing chunk. In this way, references to the existing chunk are maintained and the chunk is not unlinked (i.e. deleted) even if other references to the chunk are removed.

As another example, if instead it is determined that the chunk is not already stored on the networked storage system, then the block map update information may include new block map and/or MDS entries that point to the storage location of the new chunk transmitted at operation 514. For instance, the block map entry may include a data store ID associated with the storage location of the new chunk.

Figure 6:
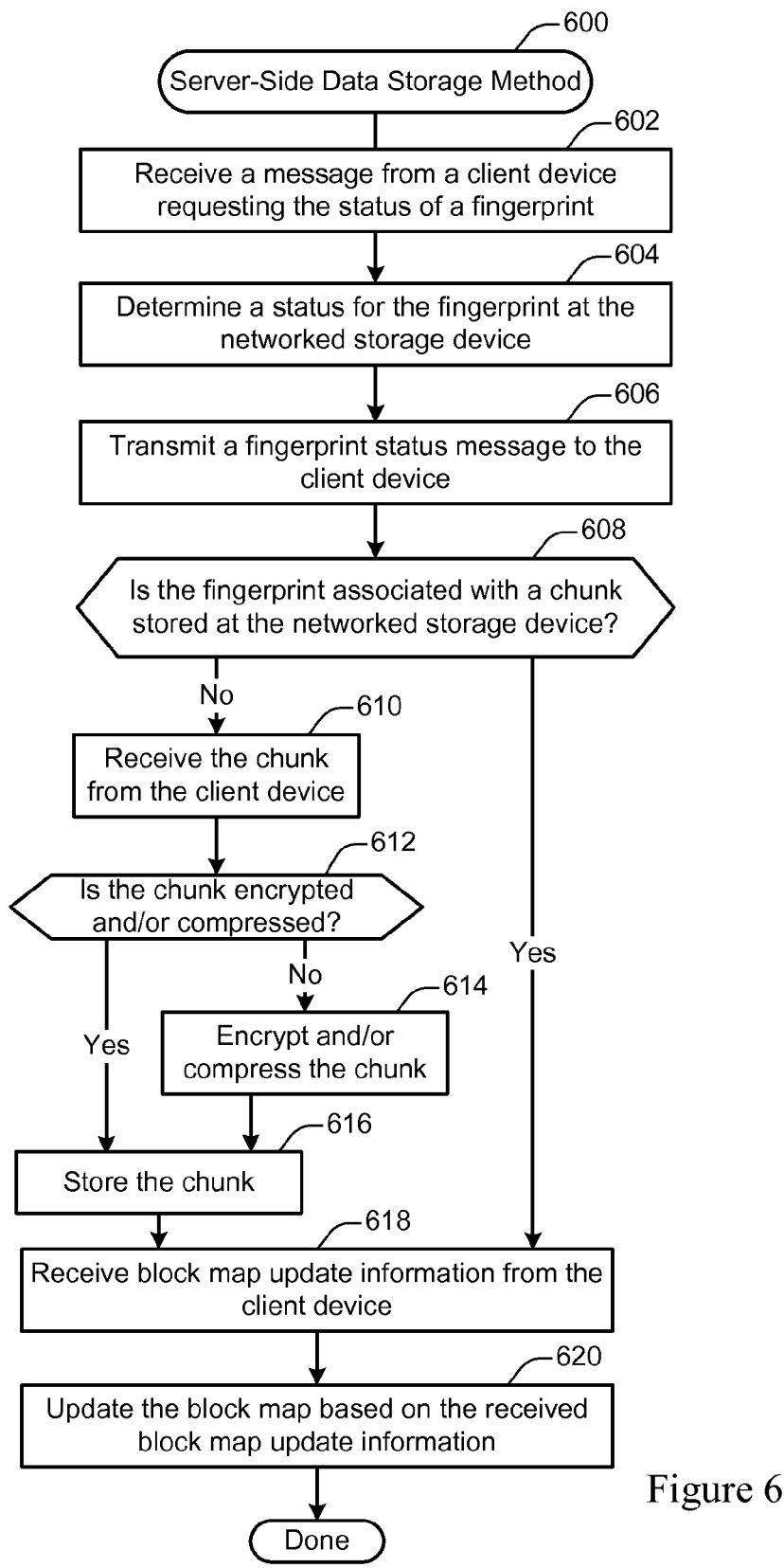
FIG. 6 illustrates a server-side data storage method, performed in accordance with one or more embodiments.

FIG. 6 illustrates a server-side data storage method 600, performed in accordance with one or more embodiments. The method 600 may be performed at a networked storage system such as the system 102 shown in FIG. 1. The method 600 may be performed in conjunction with the method 500 discussed with respect to FIG. 5. For instance, the method 600 may be performed to facilitate the storage of data at a networked storage system, where the data is deduplicated at a client device from which the data originates.

At 602, a message requesting the status of a fingerprint is received at the networked storage system. According to various embodiments, the request message received at operation 602 may include one or more fingerprints that are each associated with a data chunk. The message may be received from a client device in communication with the networked storage system via a network. For instance, the message may be transmitted as part of the information retrieval operation 510 discussed with respect to FIG. 5.

At 604, a determination is made as to the status for the fingerprint identified by the request message received at operation 602. According to various embodiments, determining the status of the fingerprint may involve evaluating whether a chunk corresponding with the fingerprint is stored at the networked storage system. The networked storage system may make this determination by comparing the fingerprint to entries in the block map 320. The fingerprints stored in the block map 320 may be indexed to facilitate a rapid comparison.

At 606, a fingerprint status message is transmitted to the client device. According to various embodiments, the fingerprint status message may indicate whether a chunk associated with the fingerprint is stored at the networked storage system. For instance, the fingerprint status message may indicate the results of the determination made at operation 604.

At 608, a determination is made as to whether the fingerprint is associated with a chunk stored at the networked storage system. According to various embodiments, the determination may be made based on the status information determined at operation 604.

At 610, if the chunk is not stored at the networked storage system, the chunk may be received from the networked storage system. In particular embodiments, the chunk may be transmitted as discussed with respect to operation 514 shown in FIG. 5. For instance, the chunk may be received via the TCP/IP interfaces 302 and 304 shown in FIG. 3. Then the VFS 314 may route the chunk for storage in a data store governed by the data store system 326.

At 612, a determination is made as to whether the chunk is encrypted and/or compressed. In some embodiments, a chunk may be encrypted and/or compressed at the client device, for instance if the client device has sufficient computing resources to encrypt and/or compress the chunk. The determination may be made at least in part by receiving an indication from the client device as to whether the chunk was encrypted and/or compressed. For instance, when the chunk is transmitted from the client device, the client device may transmit an indication of the encryption and/or compression status of the chunk along with the chunk itself.

At 614, the chunk is encrypted and/or compressed. According to various embodiments, the chunk may be encrypted and/or compressed by the encryption module 350 shown in FIG. 3. Any suitable encryption and/or compression technique may be used. At 616, the chunk is stored.

At 618, block map update information is received from the client device. According to various embodiments, the block map update information may be generated as discussed with respect to operation 516 shown in FIG. 5. For example, if it is determined that the chunk is already stored on the networked storage system, then the block map update information may include new block map and/or MDS entries that point to the existing chunk. In this way, references to the existing chunk are maintained and the chunk is not unlinked (i.e. deleted) even if other references to the chunk are removed. As another example, if instead it is determined that the chunk is not already stored on the networked storage system, then the block map update information may include new block map and/or MDS entries that point to the storage location of the new chunk stored at operation 612. For instance, the block map entry may include a data store ID associated with the storage location of the new chunk.

At 620, the block map is updated based on the received block map update information. According to various embodiments, updating the block map may involve entering the changes identified in operation 614 in the block map 320 shown in FIG. 3.

Figure 7:
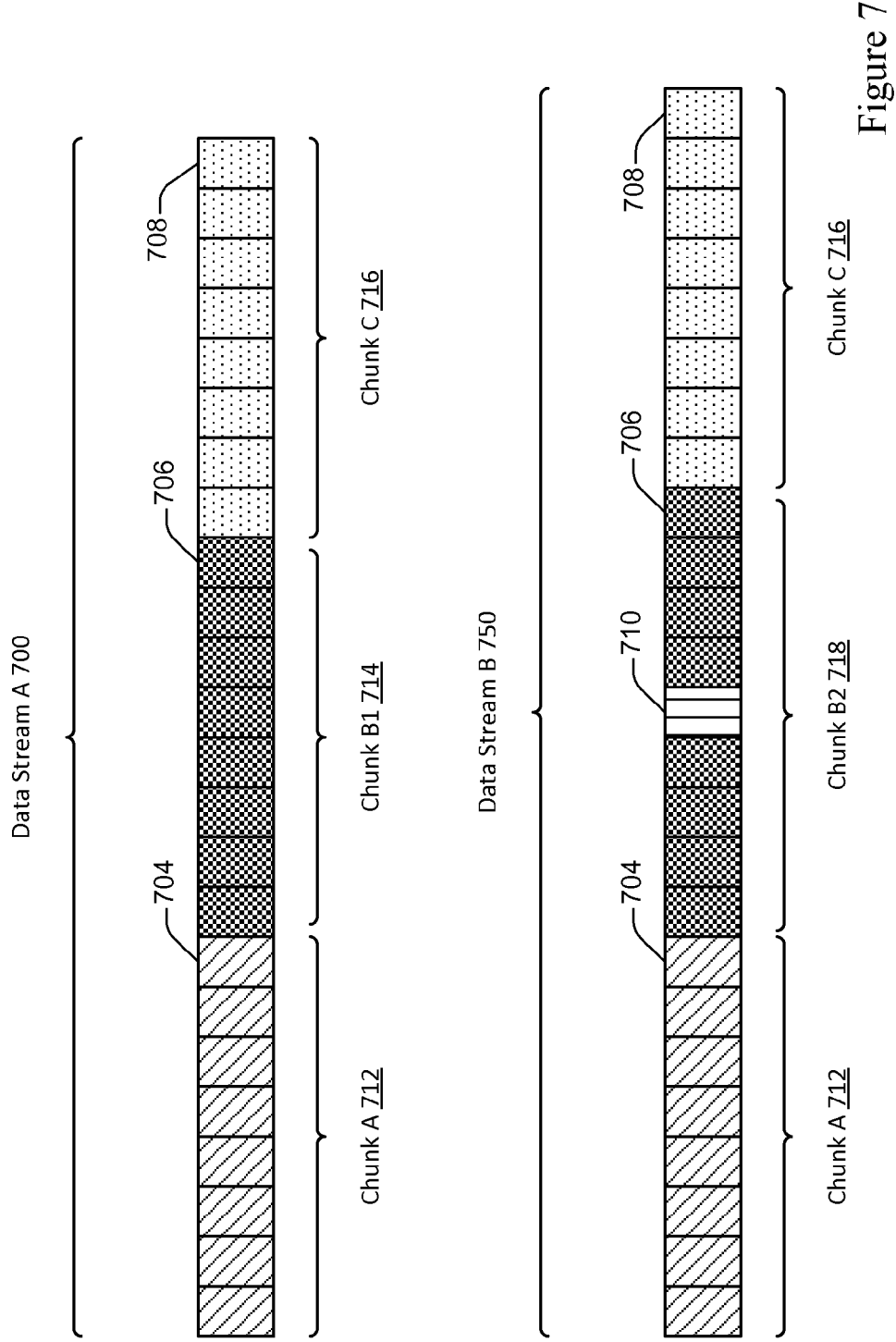
FIG. 7 illustrates a configuration of data streams, presented in accordance with one or more embodiments.

FIG. 7 illustrates a configuration of data streams, presented in accordance with one or more embodiments. FIG. 7 includes data stream A 700 and data stream B 750. The data streams are parsed into chunks 708, 710, 712, and 714 by a parser. The data streams include a plurality of data segments, including data segments 704-710. Each data segment may represent one or more bits, bytes, or any other unit of data size. FIG. 7 shows how two similar but not identical data streams may be parsed similarly to produce, in at least some instances, at least some identical chunks.

In some embodiments, a data stream may be parsed by a parser into chunks. The parser may compute a rolling hash function to identify chunk barriers. For instance, the parser may compute a rolling hash that includes the data segment 704. When the hash is computed, it may be compared with one or more boundary condition criteria to determine whether the parsing of the data stream has reached a chunk boundary. For instance, a chunk boundary may be identified when a rolling hash value is a prime number, is divisible by a designated value, or has some other such mathematical property.

In the example shown in FIG. 7, the data segment 704 represents such a chunk boundary. Accordingly, the parser draws a boundary, and the data between the chunk boundary at the data segment 704 and the previous chunk boundary is designated as chunk A 712. The parser continues parsing the data stream A 700 in this fashion, reaching a new boundary at the data segment 706 and designating the chunk B1 714, and reaching another boundary at the data segment 708 and designating the chunk C 716.

In the example shown in FIG. 7, the data stream B 750 is similar but not identical to the data stream A 700. In the data stream B 750, the data segment 710 has been added. This is a relatively small and specific example modification for the purpose of illustration. Nevertheless, various types of modifications are possible. For instance, data segments may be added, removed, or altered.

According to various embodiments, a parser may parse the data stream B 750 in a manner substantially similar to the parsing of the data stream A 700. For instance, the parser reaches a boundary at the data segment 704 and designating the chunk A 712. Then, the parser reaches another boundary at the data segment 706 and designates the chunk B2 718. Finally, the parser reaches a boundary at the data segment 708 and designates the chunk C 716.

In the example shown in FIG. 7, both data streams include chunk A 712 as well as chunk C 716. Since the same data is included in these chunks as parsed by both data streams, the fingerprints of these chunks are identical as well. Thus, if both data streams are stored to a deduplication storage system, only one copy of chunk A 712 and chunk C 716 need be stored. In contrast, in the example shown in FIG. 7, chunk B1 714 is different than chunk B2 718. Thus, chunks B1 714 and B2 718 will have different fingerprints, and both chunks can be stored in the deduplication storage system.

According to various embodiments, techniques and mechanisms described herein may facilitate the client-side deduplication of data streams such as the ones shown in FIG. 7. For instance, if the data stream B 750 is processed for writing to a networked storage system after the data stream A 750 has already been written to the networked storage system, then only the data chunk B2 718 need be transmitted from the client device to the networked storage system. In particular embodiments, such client-side deduplication may be performed even when data write requests are provided at the client device via a standard and/or non-proprietary communication protocol that does not conventionally support client-side deduplication.

Figure 8:
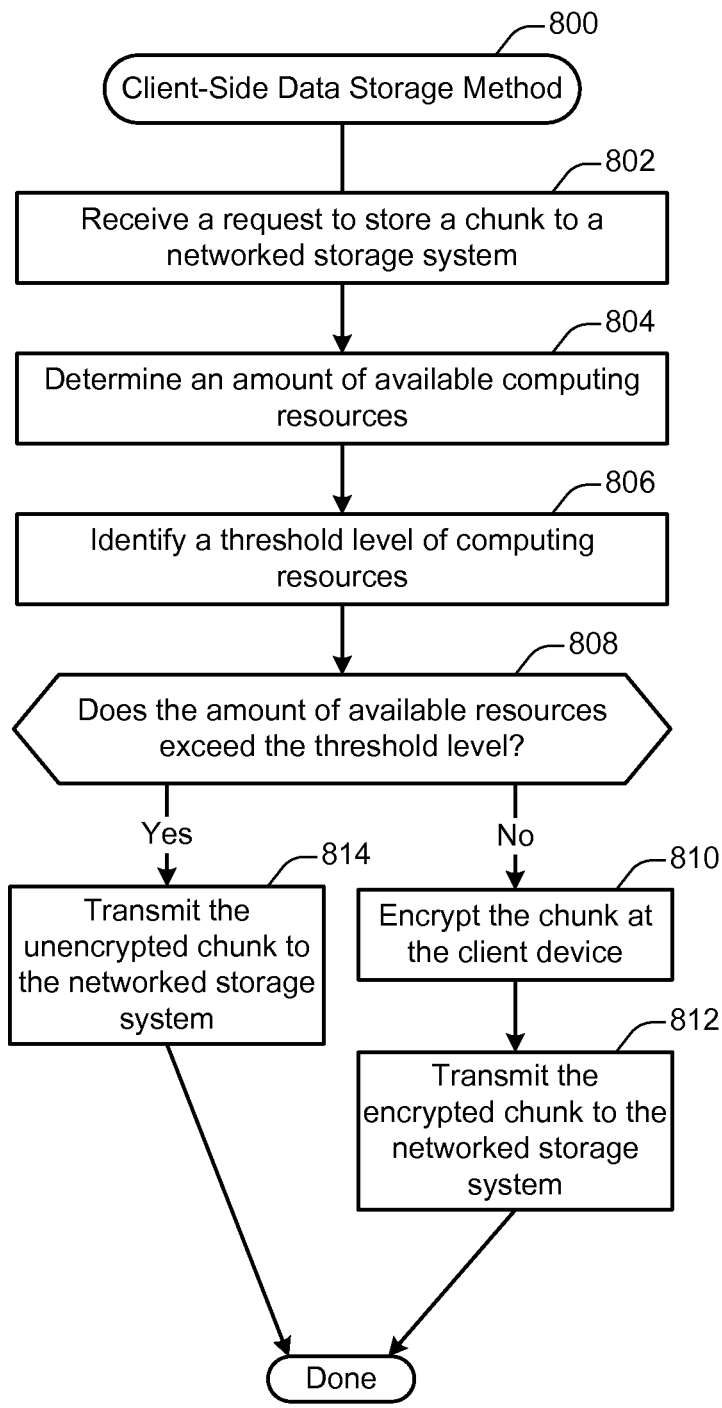
FIG. 8 illustrates a client-side data storage method, performed in accordance with one or more embodiments.

FIG. 8 illustrates a client-side data storage method 800, performed in accordance with one or more embodiments. The method 800 may be performed at a client device in communication with a networked storage system. For instance, the client device and networked storage system may be configured as shown in FIGS. 1-4. The method 800 may be performed when it is determined that a data chunk needs to be transmitted to the networked storage system for storage.

At 802, a request to store a chunk to a networked storage system is received. According to various embodiments, the request may be generated as part of a storage procedure for storing a data stream, a file, or some other data object to the networked storage system. For instance, the request may be generated as part of the operation 514 shown in FIG. 5.

At 804, a determination is made as to an amount of available computing resources. In some embodiments, the computing resources may describe resources available at the client device. Alternately, or additionally, the computing resources may describe resources available at the networked storage system. For instance, the client device may communicate with the networked storage device to determine whether the networked storage device has resources available or is overburdened with tasks such as fielding data storage or retrieval requests.

According to various embodiments, the computing resources may include any or all resources that may affect or be affected by an encryption process performed at the client device and/or networked storage system. For example, the computing resources may indicate one or more hardware usage characteristics such as processor usage, memory usage, or storage system usage. As another example, the computing resources may indicate one or more network usage characteristics such as a number of storage requests or an amount of bandwidth usage. As yet another example, the computing resources may indicate a level of software usage such as the number of software threads being executed by a processor system.

In particular embodiments, the computing resources may indicate an amount of a resource in use, an amount of a resource available, or both. For instance, in the case of processor usage, the resource availability determined at operation 804 may indicate a percentage of processing power that is in use and/or a percentage of processing power that remains available for use.

At 806, a threshold level of computing resources is identified. In particular embodiments, the threshold level of computing resources may indicate one or more conditions under which a chunk is to be designated for encryption at the client device or the networked storage system. For instance, the threshold level may indicate that a chunk is to be designated for encryption at the client device if the client device has a designated percentage of processing power available and a designated amount of unused memory available.

In particular embodiments, the threshold level of computing resources may indicate a single threshold value for one type of computing resource such as processor available. Alternately, the threshold level of computing resources or may indicate a combination of threshold values for different types of computing resources, such as processor and memory availability.

In some implementations, the threshold level may be strategically determined based on characteristics such as hardware and/or software available at the client device, the hardware and/or software available at the networked storage system. The threshold level may be implemented at least in part as an absolute restriction, such as a percentage of available processing power. Alternately, or additionally, the threshold level may be implemented at least in part as a relative restriction. For instance, the threshold may be met if the client device has a greater proportion of available resources than the networked storage system.

At 808, a determination is made as to whether the amount of available resources exceeds the threshold level. In some embodiments, the determination may be made by comparing the resources determined at operation 804 with the threshold level identified at operation 806.

At 810, the chunk is encrypted at the client device. According to various embodiments, the chunk may be encrypted with the encryption module 416 discussed with respect to FIG. 4. Any suitable encryption and/or compression technique may be used.

At 812, the encrypted chunk is transmitted to the networked storage system. At 814, the unencrypted chunk is transmitted to the networked storage device. According to various embodiments, the chunk may be transmitted to the networked storage system as discussed with respect to operation 514.

In particular embodiments, chunk metadata describing the chunk may be transmitted along with the chunk itself. For instance, the chunk metadata may identify whether the chunk was encrypted at the client device.

Figure 9:
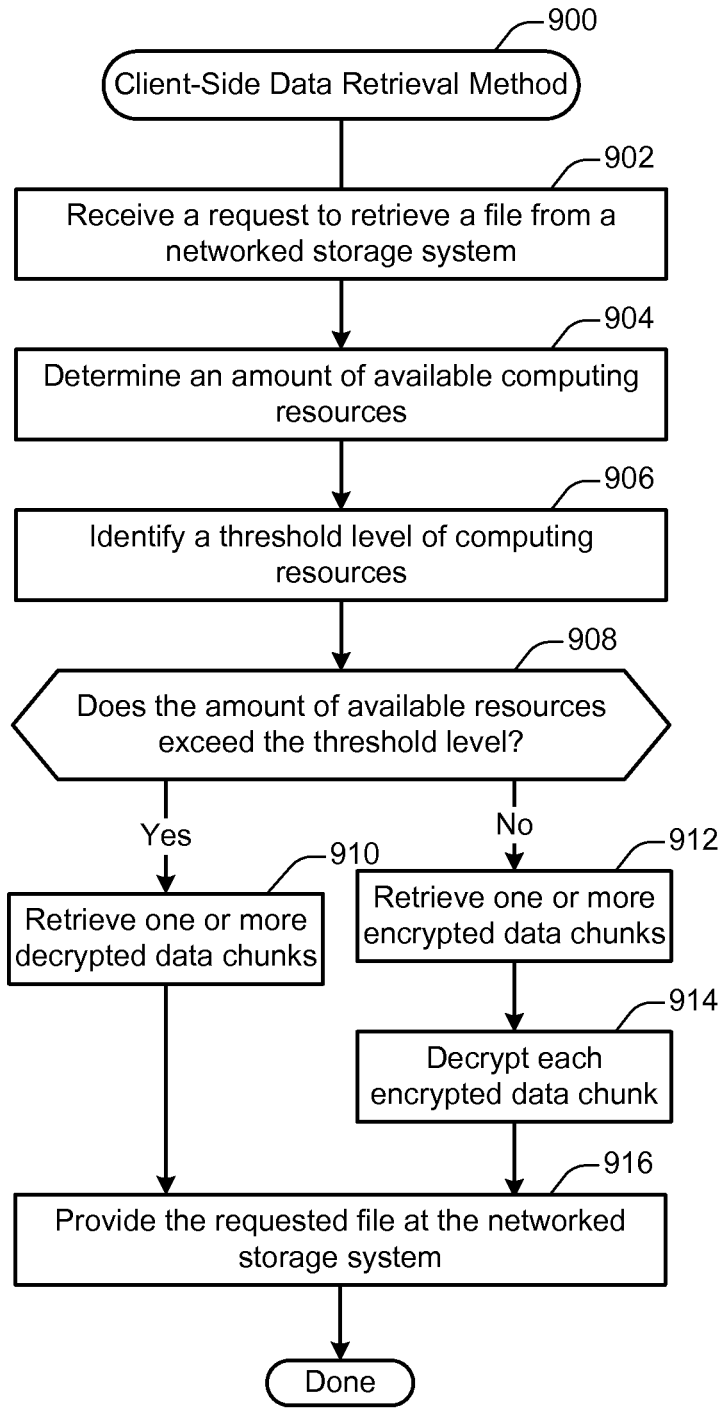
FIG. 9 illustrates a client-side data retrieval method, performed in accordance with one or more embodiments.

FIG. 9 illustrates a client-side data retrieval method 900, performed in accordance with one or more embodiments. The method 900 may be performed at a client device in communication with a networked storage system, for instance as shown in FIGS. 1-4. The method 900 may be performed to retrieve data such as a file stored on a networked storage system.

At 902, a request to retrieve a file from a networked storage system is received. According to various embodiments, the request may be generated as part of a retrieval procedure for retrieving a data stream, a file, or some other data object from the networked storage system. For instance, the request may be received at the client protocol module 402 in the communications protocol interface 114 implemented at a client device.

At 904, a determination is made as to an amount of available computing resources. In some embodiments, the computing resources may describe resources available at the client device. Alternately, or additionally, the computing resources may describe resources available at the networked storage system. For instance, the client device may communicate with the networked storage device to determine whether the networked storage device has resources available or is overburdened with tasks such as fielding data storage or retrieval requests.

According to various embodiments, the computing resources may include any or all resources that may affect or be affected by a decryption process performed at the client device and/or networked storage system. For example, the computing resources may indicate one or more hardware usage characteristics such as processor usage, memory usage, or storage system usage. As another example, the computing resources may indicate one or more network usage characteristics such as a number of storage requests or an amount of bandwidth usage. As yet another example, the computing resources may indicate a level of software usage such as the number of software threads being executed by a processor system.

In particular embodiments, the computing resources may indicate an amount of a resource in use, an amount of a resource available, or both. For instance, in the case of processor usage, the resource availability determined at operation 904 may indicate a percentage of processing power that is in use and/or a percentage of processing power that remains available for use.

In some implementations, the determination of an amount of available computing resources at operation 904 may be similar to the determination of an amount of available computing resources at operation 804. Alternately, different computing resources may be selected for analysis. For instance, encrypting and/or compressing a data chunk may implicate different combinations of resources than decrypting and/or decompressing a data chunk.

At 906, a threshold level of computing resources is identified. In particular embodiments, the threshold level of computing resources may indicate one or more conditions under which a chunk is to be designated for decryption at the client device or the networked storage system. For instance, the threshold level may indicate that a chunk is to be designated for decryption at the client device if the client device has a designated percentage of processing power available and a designated amount of unused memory available.

In particular embodiments, the threshold level of computing resources may indicate a single threshold value for one type of computing resource such as processor available. Alternately, the threshold level of computing resources or may indicate a combination of threshold values for different types of computing resources, such as processor and memory availability.

In some implementations, the threshold level may be strategically determined based on characteristics such as hardware and/or software available at the client device, the hardware and/or software available at the networked storage system. The threshold level may be implemented at least in part as an absolute restriction, such as a percentage of available processing power. Alternately, or additionally, the threshold level may be implemented at least in part as a relative restriction. For instance, the threshold may be met if the client device has a greater proportion of available resources than the networked storage system.

In some implementations, the identification of a threshold level of computing resources at operation 906 may be similar to the determination of a threshold level of available computing resources at operation 806. Alternately, different threshold levels may be identified. For instance, encrypting and/or compressing a data chunk may implicate different combinations of resources than decrypting and/or decompressing a data chunk.

At 908, a determination is made as to whether the available computing resources exceed the threshold level. In some embodiments, the determination may be made by comparing the resources determined at operation 904 with the threshold level identified at operation 906.

At 910, if it is determined that the available computing resources do not exceed the threshold level, then one or more decrypted chunks associated with the requested file are retrieved from the networked storage system. At 912, if instead it is determined that the available computing resources do exceed the threshold level, then one or more encrypted chunks associated with the requested file are retrieved from the networked storage system.

According to various embodiments, a chunk may be retrieved from the networked storage system by transmitting a message identifying the chunk to the networked storage system along with a request to receive the identified chunk. The message may include a request that the networked storage system decrypted the identified chunk prior to transmission. Alternately, the message may include a request that the networked storage system transmit an encrypted chunk.

At 914, the encrypted chunks are decrypted at the client device. According to various embodiments, the chunk may be decrypted with the encryption module 416 discussed with respect to FIG. 4. Any suitable decryption and/or compression technique may be used. For instance, the decryption and/or decompression techniques may reverse the encryption and/or compression performed as discussed with respect to operation 810 discussed with respect to FIG. 8.

According to various embodiments, providing the requested file at the client device may involve combining the encrypted or decompressed chunks to produce a file. For instance, the networked storage system may transmit chunk file offset information for use in ordering and positioning chunks within a file. The file that is composed of the different chunks may then be provided as a data stream over a bus to another module at the client device such as a memory location, a persistent storage module, or a processor.

According to various embodiments, the computing resources may be checked periodically, at scheduled times, or upon request. In the method 900, the availability of computing resources is checked before retrieving at file.

However, the availability of computing resources may be checked before retrieving each chunk, before retrieving a data stream including more than one file, before or after retrieving a designated amount of data, before or after retrieving a designated number of chunks, or at any other interval.

Because various information and program instructions may be employed to implement the systems/methods described herein, the present invention relates to non-transitory machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
    at a client device comprising a processor and memory, parsing a data stream to identify one or more uncompressed data chunks for transmission to a networked storage system;
    identifying an amount of available computing resources at the client device;
    when the identified amount of available computing resources meets or exceeds a designated computing resource availability compression threshold, compressing each uncompressed data chunk to produce a respective compressed data chunk, and transmitting each compressed data chunk to the networked storage system via a network for storage at the networked storage system; and
    when the identified amount of available computing resources is below the designated computing resource availability compression threshold, encrypting each uncompressed data chunk prior to transmission, and transmitting each encrypted, uncompressed data chunk to the networked storage system via the network;
    wherein one or more uncompressed data chunks are identified via a rolling hash parsing technique operable to generate at least some identical chunks when parsing different but overlapping data streams.

2. The method recited in claim 1, the method further comprising:
    identifying a respective fingerprint for each uncompressed data chunk by applying a hash function to the uncompressed data chunk.

3. The method recited in claim 2, the method further comprising:
    determining whether the uncompressed data chunk is stored at a networked storage system by transmitting each fingerprint to the networked storage system via the network.

4. The method recited in claim 3, the method further comprising:
    transmitting a block map update request message to the networked storage system, the block map update request message including information for updating a block map at the networked storage system, the block map identifying a designated memory location at which each data compressed chunk is stored at the networked storage system.

5. The method recited in claim 3, wherein determining whether the uncompressed chunk is stored at the networked storage system further comprises receiving a fingerprint status message from the networked storage system, the fingerprint status message indicating whether the chunk associated with the fingerprint is stored at the networked storage system.

6. The method recited in claim 1, the method further comprising:
    encrypting each compressed data chunk prior to transmission.

7. The method recited in claim 1, wherein the networked storage system is operable to store deduplicated data based on storage requests received via the network.

8. The method recited in claim 1, the data stream is generated at the client device via a network storage protocol selected from the group consisting of: the Network File System (NFS) protocol, the Common Internet File System (CIFS) protocol, and the Open Storage (OST) protocol.

9. A device comprising:
    memory operable to store one or more uncompressed data chunks for transmission to a networked storage system, the one or more uncompressed data chunks identified by parsing a data stream;
    a processor operable to identify an amount of available computing resources at the device and:
    compress each uncompressed data chunk to produce a respective compressed data chunk when the identified amount of available computing resources meets or exceeds a designated computing resource availability compression threshold; and
    encrypt each uncompressed data chunk prior to transmission when the identified amount of available computing resources is below the designated computing resource availability compression threshold; and
    a communications interface operable to:
    transmit, via a network for storage at the networked storage system, each compressed data chunk to the networked storage system when the identified amount of available computing resources meets or exceeds the designated computing resource availability compression threshold; and
    transmit each encrypted, uncompressed data chunk to the networked storage system via the network when the identified amount of available computing resources is below the designated computing resource availability compression threshold;
    wherein one or more uncompressed data chunks are identified via a rolling hash parsing technique operable to generate at least some identical chunks when parsing different but overlapping data streams.

10. The device recited in claim 9, wherein the processor is further operable to:
  identify a respective fingerprint for each uncompressed data chunk by applying a hash function to the uncompressed data chunk.

11. The device recited in claim 10, wherein the processor is further operable to:
  determine whether the uncompressed data chunk is stored at a networked storage system by transmitting each fingerprint to the networked storage system via the network.

12. One or more non-transitory computer readable media having instructions stored thereon for performing a method, the method comprising:
  at a client device comprising a processor and memory, parsing a data stream to identify one or more uncompressed data chunks for transmission to a networked storage system;
  identifying an amount of available computing resources at the client device;
  when the identified amount of available computing resources meets or exceeds a designated computing resource availability compression threshold,
  compressing each uncompressed data chunk to produce a respective compressed data chunk; and
  transmitting each compressed data chunk to the networked storage system via a network for storage at the networked storage system; and
  when the identified amount of available computing resources is below the designated computing resource availability compression threshold,
  encrypting each uncompressed data chunk prior to transmission, and
  transmitting each encrypted, uncompressed data chunk to the networked storage system via the network;
  wherein one or more uncompressed data chunks are identified via a rolling hash parsing technique operable to generate at least some identical chunks when parsing different but overlapping data streams.

* * * * *